Oct. 23, 1962

S. LOEWE 3,059,871

MAGNETIC-TAPE-REEL DEVICE

Original Filed Oct. 5, 1954

SIEGMUND LOEWE
*INVENTOR.*

BY Karl F. Ross

AGENT

United States Patent Office 3,059,871
Patented Oct. 23, 1962

3,059,871

MAGNETIC-TAPE-REEL DEVICE

Siegmund Loewe, 68 Ridge Road, Yonkers, N.Y.

Original application Oct. 5, 1954, Ser. No. 482,630. Divided and this application Feb. 28, 1958, Ser. No. 718,318
Claims priority, application Germany Oct. 10, 1953
2 Claims. (Cl. 242—55.13)

Figure 1A:
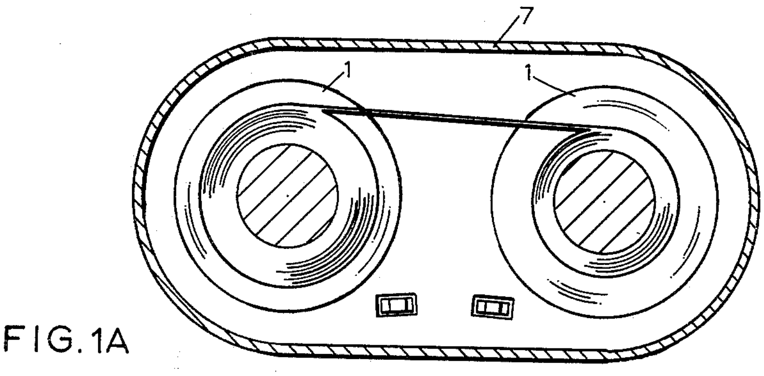

This application is a division of application Serial No. 482,630, filed October 5, 1954, and now abandoned.

In the use of tape-reel magazines for magnetic-tape recording and/or reproducing devices it is necessary to brake the reel discs when removing the case from the apparatus or the propulsion shafts because of the danger that as a result of vibrations the magnetic tape may unwind from the reel discs which can give rise to disturbances when the magazine is replaced on the machine. Such unwinding of the tape is most effectively prevented by means of a suitable braking device, which makes it impossible for the reels to turn counter to each other. In accordance with the invention, in order to achieve this goal, use is made of the fact that the tape can unwind from the reel discs in only one of the two possible opposed directions while in the opposite direction of turn it tightens by itself and thus automatically prevents unwinding.

Figures 1B, 2A:
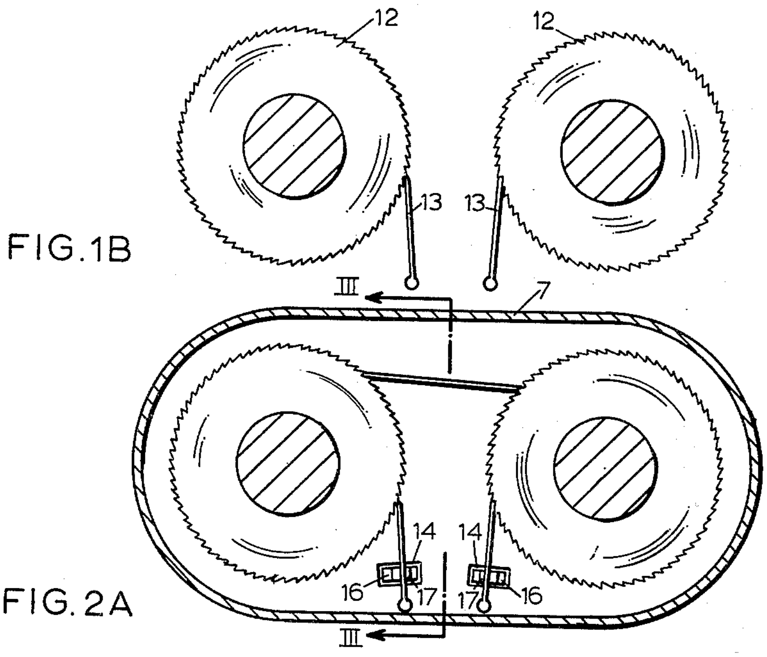
Figure 2B:
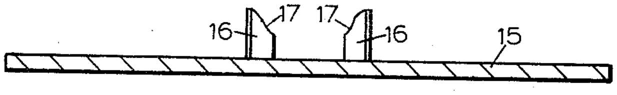
Figure 3:
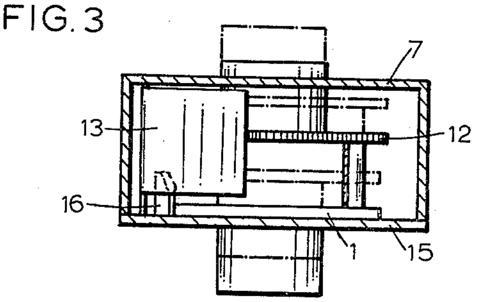

In the drawing:

FIG. 1*a* is a sectional plan view of a cartridge according to my invention;

FIG. 1*b* is a plan view of the ratchet mechanism associated with the reels visible in FIG. 1*a*;

FIG. 2*b* is a side-elevational view of the supporting surface of a recording and/or reproducing apparatus designed to receive the cartridge of FIGS. 1*a* and 2*a*; and FIG. 3 is a cross-sectional view of the overall assembly, taken on the line III—III of FIG. 2*a* and illustrating one of the reels in its two alternate axial positions within the magazine housing of the cartridge mounted on the transducer.

FIGS. 1*a* and 1*b* illustrate the principle diagrammatically. During operation the reel discs 1 always run in the same direction, i.e. either both clockwise or both counter-clockwise, corresponding to the forward or backward motion of the tape. At the same time the tape is held as much as possible at a constant tension by means of special devices on the recorder.

When the case is removed the tape can unwind when the reel discs 1 are turned counter to each other but only when the left disc turns clockwise or the right disc counter-clockwise. In the reverse case, i.e. when the right reel disc turns clockwise and the left counter-clockwise, the tape is wound up. It is therefore only necessary to prevent the possibility of turning the reel discs in one of the opposed directions resulting in the unwinding of the tape.

In accordance with the invention this is accomplished by having the edge of the reel disc milled or some other part of the circumference which is centrally connected with the reel disc, for example the reel core or a cylindrical reel carrier 12 as shown in FIG. 1*b*, provided with ratchet teeth engaged by a spring 13 serving as a retaining pawl. This effectively prevents the disc from turning in that opposed direction which can result in an unwinding of the tape from one of the reel cores. In the simplest case the retaining pawls 13 consist of leaf springs. When they are disengaged from the ratchet teeth, they release the reel discs for operation so that they can be turned in either direction. However, while engaged with the ratchet teeth and thus preventing an undesired turning of the discs, they nevertheless permit a lifting and lowering of the discs within the magazine, i.e. a motion of the reel discs 1 relative to the housing of the magazine 7 (as illustrated in solid and dot-dash lines in FIG. 3) according to whether the disc is positioned for operation or is removed from the supporting surface 15 of the associated apparatus. The pawl springs 13 remain engaged with the same indentation of the milled edge. The discs simply slide on the engaged edges of the pawl springs 13 up and down in an axial direction.

This partiicular construction of the braking device has the special advantage described below.

It is of advantage for the practical handling of the case to have the braking occur automatically when the case is lifted from the recorder and also to release the brake action automatically when the case is placed on the recorder. This occurs for example in the manner explained with reference to FIGS. 2*a* and 2*b*. In the floor of the magazine housing 7 there are slots 14. At corresponding locations on the surface 15 of the recorder on which the case is placed, there are prongs 16 which, when the magazine is operatively positioned, pass through the slots 14 and with their suitably shaped camming edges 17 disengage the pawl springs 13 from the milled disc edge so as to release the braking. The shape of the camming edges 17 can be so selected that the detents are released and the reel discs are freed for turning in any desired direction only a short time before the magazine reaches its operating position. If the magazine is lifted from its base, the brake action again takes place automatically, thus preventing any undesirable unwinding of the tape.

What I claim is:

1. In a transducer utilizing a magnetic recording tape, in combination, a cartridge comprising a housing, a pair of tape-carrying reels rotatably mounted in said housing with freedom of limited axial displacement, each of said reels being provided with a peripheral set of ratchet teeth, a pair of pawl members mounted in said housing for pivotal movement about axes parallel to the reel axes for respectively engaging the ratchet teeth of said reels in a sense preventing unidirectional rotation thereof in a tape-slackening direction, said housing having an apertured bottom wall, and a support for said cartridge provided with a pair of upstanding pawl-releasing elements having extremities with camming surfaces positioned to project through said apertured bottom wall upon deposition of said cartridge on said support for disengaging said pawl members from said ratchet teeth, said pawl members prior to such disengagement permitting said limited axial displacement of said reels.

2. The combination according to claim 1 wherein said pawl members are leaf springs.

References Cited in the file of this patent

UNITED STATES PATENTS

| | | |
|---|---|---|
| 579,949 | Brownell | Apr. 6, 1897 |
| 2,572,596 | Camras | Oct. 23, 1951 |
| 2,651,964 | Doyle | Sept. 15, 1953 |
| 2,778,880 | Eash | Jan. 22, 1957 |